US005183697A

United States Patent [19]

Ide et al.

[11] Patent Number: 5,183,697

[45] Date of Patent: Feb. 2, 1993

[54] THERMAL IMAGE TRANSFER RECORDING MEDIUM

[75] Inventors: Youji Ide, Mishima; Keiichi Shiokawa, Numazu, both of Japan

[73] Assignee: Ricoh Company, Ltd., Tokyo, Japan

[21] Appl. No.: 879,129

[22] Filed: May 5, 1992

Related U.S. Application Data

[63] Continuation of Ser. No. 675,679, Mar. 27, 1991, abandoned.

[30] Foreign Application Priority Data

Mar. 28, 1990 [JP] Japan .................................. 2-77098

[51] Int. Cl.[5] ............................................... B32B 3/00

[52] U.S. Cl. .................................... 428/195; 428/212; 428/321.3; 428/484; 428/488.1; 428/488.4; 428/913; 428/914

[58] Field of Search ..................... 428/195, 212, 321.3, 428/484, 488.1, 488.4, 913, 914

[56] References Cited

U.S. PATENT DOCUMENTS

| | | | |
|---|---|---|---|
| 4,794,039 | 12/1988 | Shini | 428/321.3 |
| 4,865,913 | 9/1989 | Takeuchi et al. | 428/321.3 |
| 4,927,802 | 5/1990 | Leatherman | 503/214 |

*Primary Examiner*—Patrick J. Ryan
*Assistant Examiner*—Elizabeth Evans
*Attorney, Agent, or Firm*—Oblon, Spivak, McClelland, Maier & Neustadt

[57] ABSTRACT

A thermal image transfer recording medium is composed of a support and an ink layer formed thereon which includes (i) a lower thermal image transfer portion located in the vicinity of the support, containing a three-dimensional network structure of a resin with a voidage A and a thermofusible ink which is held within the network structure, and (ii) an upper thermal image transfer portion located on top of the lower thermal image transfer layer portion, containing a fine porous structure of a resin with a voidage B which is smaller than the voidage A of the network structure, and a thermofusible wax component which is held within the porous structure, and the network structure being at least partially connected to both the porous structure and the support.

20 Claims, 1 Drawing Sheet

THERMAL IMAGE TRANSFER RECORDING MEDIUM

This application is a continuation of application Ser. No. 07/675,679, filed on Mar. 27, 1991, now abandoned.

BACKGROUND OF THE INVENTION

1. Field of the Invention

This invention relates to a thermal image transfer recording medium which can yield images with high density with a minimized decrease in the image density even when it is used repeatedly.

2. Discussion of Background

Recording apparatus, such as a printer and a facsimile apparatus, using a thermal image transfer recording method, is now widely used. This is because the recording apparatus of this type is relatively small in size and can be produced inexpensively, and the maintenance is simple.

In a conventional thermal image transfer recording medium for use with the thermal image transfer recording apparatus, a single ink layer is merely formed on a support. When such a recording medium is used for printing images, the portions of the ink layer heated by a thermal head are completely transferred to an image receiving sheet at only one-time printing, so that the recording medium can be used only once, and can never be used repeatedly. The conventional recording medium is thus disadvantageous from the viewpoint of running cost.

In order to overcome the above drawback in the prior art, there have been proposed the following methods:

(1) A microporous ink layer containing a thermofusible ink is formed on a support so that the ink can gradually ooze out from the ink layer as disclosed in Japanese Laid-Open Patent Applications 54-68253 and 55-105579;

(2) A porous film is provided on an ink layer formed on a support so that the amount of an ink which oozes out from the ink layer can be controlled as disclosed in Japanese Laid-Open Patent Application 58-212993; and (3) An adhesive layer is interposed between an ink layer and a support so that an ink in the ink layer can be gradually exfoliated in the form of a thin layer from the ink layer when images are printed as disclosed in Japanese Laid-Open Patent Applications 60-127191 and 60-127192.

However, the above three methods have shortcomings as described below.

When the above method (1) is employed, the ink cannot sufficiently ooze out after repeated use of the recording medium. As a result, the density of printed images gradually decreases as the printing operation is repeated.

In the method (2), the mechanical strength of the porous film is decreased if the size of each pore is increased in order to increase the image density, and thus the ink layer tends to peel off the support, together with the porous film.

As for the method (3), the amount of the ink which peels off the ink layer cannot be controlled uniformly in the course of image printing.

Furthermore, most of the conventional methods have been developed in such a fashion as to be suitable for use with a serial thermal head in a recording apparatus such as a word processor. Therefore, when those methods are applied to a line thermal head for use in a recording apparatus such as a facsimile apparatus and a bar code printer, problems such as the exfoliation of an ink layer, and the decrease of image density are inevitable because the time elapsed before an image transfer sheet is separated from the image transfer recording medium is relatively long after the image transfer sheet is brought into contact with the image receiving sheet under application of heat thereto.

In addition, in a thermofusible ink prepared by a conventional method, the ink-dispersed system itself tends to be destroyed by the heat applied thereto by a thermal head in the course of repeated printing. As a result, the optical density of the image printed on an image receiving sheet by the ink is no longer high enough for us in practice.

Under these circumstances, there is a demand for a thermal image transfer recording medium which is suitable for use with a line thermal head and can yield images with high image density with a minimum decrease in the image density even when it is used repeatedly.

SUMMARY OF THE INVENTION

Accordingly, an object of this invention is to provide a thermal image transfer recording medium which can continuously yield images with high density even when used repeatedly, in particular when image printing is performed by use of a line thermal head.

This object of the present invention can be attained by a thermal image transfer recording medium comprising a support and an ink layer formed thereon which comprises (i) a lower thermal image transfer portion located in the vicinity of the support, comprising a three-dimensional network structure of a resin with a voidage A and a thermofusible ink which is held within the network structure, and (ii) an upper thermal image transfer portion located on top of the lower thermal image transfer portion, comprising a fine porous structure of a resin with a voidage B which is smaller than the voidage A of the network structure, and a thermofusible wax component which is held within the porous structure, and the network structure being at least partially connected to both the porous structure and the support.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
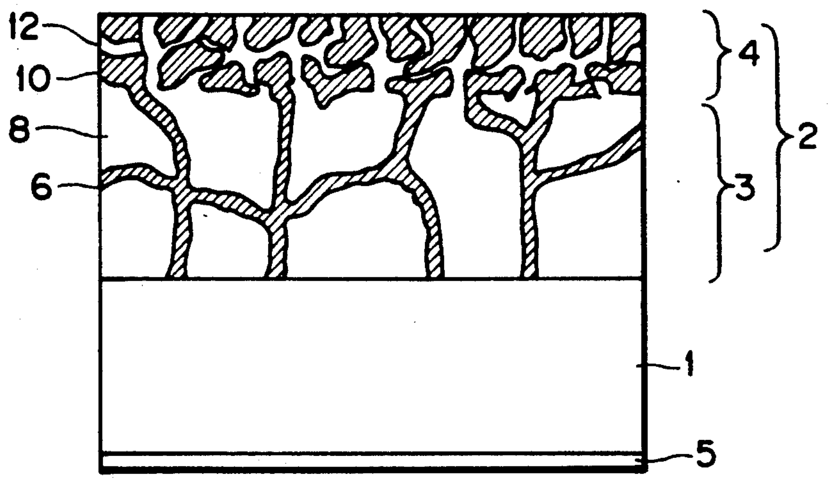
FIG. 1 is a schematic partial cross-sectional view of a thermal image transfer recording medium according to the present invention.

The thermal image transfer recording medium according to the present invention comprises a support and an ink layer formed thereon. The ink layer comprises (i) a lower thermal image transfer portion located in the vicinity of the support, comprising a three-dimensional network structure of a resin (hereinafter referred to as the resin network structure) with a voidage A and a thermofusible ink which is held within the network resin structure, and (ii) an upper thermal image transfer portion located on top of the lower thermal image transfer portion, comprising a fine porous resin structure of a resin (hereinafter referred to as the porous resin structure) with a voidage B which is smaller than the voidage A, and a thermofusible wax component which is held within the porous resin structure, and the resin network structure is at least partially connected to the porous resin structure and the support.

In this recording medium, since the voidage A of the resin network structure in the lower thermal image transfer portion is much larger than the voidage B of the porous resin structure in the upper thermal image transfer portion, the resin network structure can hold therein a large amount of a thermofusible ink and therefore can constantly supply the ink to the porous resin structure of the upper thermal image transfer portion which is located at the surface portion of the recording medium over an extended period of time in the course of repeated printing.

Thus, the initial ink concentration at the surface of the ink layer can be maintained constant even when the recording medium is used repeatedly over an extended period of time, so that the recoding medium of the present invention can also yield high quality images constantly over an extended period of time.

Furthermore, since the resin network structure in the lower image transfer portion is connected to the porous resin structure in the upper image transfer portion and the support, the ink layer can be effectively prevented from completely peeling off the support when thermal printing is performed repeatedly by a line thermal head and when the recording medium is separated from an image receiving sheet after printing is done and the recording medium is cooled. This is one of the most important advantages of the recording medium according to the present invention over the prior art.

In addition, the upper image transfer portion of this recording medium has a fine porous resin structure in which a thermofusible ink is held, so that the amount of the ink which is transferred to an image receiving sheet can be well controlled.

In the present invention, the lower image transfer portion and the upper image transfer portion can be formed in an integrated form without any particular interface therebetween. Alternatively, the lower image transfer portion and the upper image transfer portion can be in the form of a layer, which are successively overlaid on the support as long as the two layers are integrated in the above-mentioned fashion. In this sense, it is preferable that the resins for the two image transfer portions be compatible with each other.

Referring now to the accompanying drawing, the present invention will be explained in detail.

FIG. 1 is a partial cross-sectional view of a thermal image transfer recording medium according to the present invention. In this figure, reference numeral 1 denotes a support which may be provided with a heat resistant protective layer 5.

On the support 1, there is provided an ink layer 2 comprising (i) a lower image transfer portion 3, which comprises a resinnetwork structure 6 and a thermofusible ink 8 which is held within the resin network structure 6, and (ii) an upper image transfer portion 4, which comprises a fine porous resin structure 10 and a thermofusible wax component 12 which is held within the fine porous resin structure 10. As mentioned previously, the lower image transfer portion 3 is connected to both the support 1 and the upper image transfer portion 4.

The preparation of the image transfer recording medium according to the present invention will now be explained.

The lower image transfer portion 3 can be prepared, for instance, by mixing a resin for preparing the resin network structure 6 and a thermofusible ink in the form of a gel, which is referred to as the thermofusible gelled ink, coating the mixture on the support 1 and drying the coated mixture. A blowing agent may be contained in the mixture. When a blowing agent is contained in the mixture, the coated mixture is heated after drying the same to form the resin resin network structure.

The upper image transfer portion 4 can be prepared, for instance, by mixing a resin for preparing the porous resin structure 10 and a thermofusible wax component 12 in the form of a gel or in an unmiscible state with the resin, coating the mixture on the lower transfer portion 3 and drying the coated mixture.

The bonding of the upper image transfer portion 4 with the support 1 through the lower image transfer portion 3 can be accomplished by heating the resin resin network structure to a temperature close to the softening point thereof after the formation of the upper image transfer portion 4.

Conventionally known heat-resistant materials can be used as the support of the present invention. Examples of such materials include a film of plastics such as polyester, polycarbonate, triacetyl cellulose, nylon and polyimide, and a sheet of cellophane, parchment paper or condenser paper.

It is preferable that the support has a thickness of about 2 to 15 μm from the viewpoints of thermal sensitivity and mechanical strength.

It is possible to improve the heat resistance of the recording medium by providing, as shown in FIG. 1, a heat-resistant protective layer 5 on the back side of the support 1, with which side a thermal head is brought into contact. The heat-resistant protective layer 5 can be prepared from silicone resin, fluorine-contained resin, polyimide resin, epoxy resin, phenolic resin, melamine resin or nitrocellulose.

The thermofusible ink comprising a coloring agent and a vehicle, which is contained in the lower image transfer portion 3 and is to be supplied to the upper image transfer portion 4, is required not to be compatible with the resin of the resin network structure and the resin of the fine porous resin structure.

The coloring agent can be selected from conventionally known pigments and dyes. Of the known pigments, carbon black and phthalocyanine pigments are preferably used. Among the known dyes, direct dyes, acid dyes, dispersible dyes and oil-soluble dyes are preferably used.

Examples of the vehicle include natural waxes such as beeswax, carnauba wax, whale wax, Japan wax, candelilla wax, rice bran wax, montan wax, paraffin wax, microcrystalline wax, oxidized wax, ozocerite, ceresine wax, ester wax, higher fatty acids such as margaric acid, lauric acid, myristic acid, palmitic acid, stearic acid, fromic acid and behenic acid, higher alcohols such as stearyl alcohol and behenyl alcohol, esters such as glycerol esters of fatty acids, preferably, monoglycerides, and esters such as sorbitan fatty acid ester, and amides such as stearic amide and oleic amide. These fatty acid esters can be used alone or in combination. It is preferable that the amount of these fatty acid esters in the thermofusible ink be in the range of 15 to 95 wt. %, more preferably in the range of 20 to 90 wt. % of the thermofusible ink.

When the glycerol esters and/or sorbitan fatty acid esters are employed, fatty acids with 20 or more carbon atoms are preferable for preparing those esters. Specific examples of such fatty acids are straight chain saturated fatty acids, for example, arachic acid (20), heneicosanoic acid (21), behenic acid (22), tricosanoic acid (23), lignoceric acid (24), pentacosanoic acid (25), cerotic acid (26), heptacosanoic acid (27) and montanic acid (28), in which the figures in the parentheses denote the number of carbon atoms; and unsaturated fatty acids such as erucic acid.

The gelling of the thermofusible ink can be performed by a solvent dispersing method, a hot-melt dispersing method, and a method using a gelation agent.

In the case of the solvent dispersing method, the thermofusible ink is dispersed in a proper solvent at an appropriately high temperature, followed by cooling the dispersion to room temperature. It is preferable to disperse the thermofusible ink at a temperature between 25 to 40° C. for obtaining appropriate gelling effect, and image transfer effect when the thermal image transfer recording medium is prepared, and in view of the safety in the preparation of the recording medium.

The thermofusible ink can also be gelled by using a gelation agent such as a glycerol fatty acid ester. The amount of the gelation agent to be added is preferably 5 to 50 wt. % of the total weight of the solid components of the thermofusible ink.

When the hot-melt dispersing method is employed, the components of the thermofusible ink, that is, the coloring agent and the vehicle are mixed at an elevated temperature by using a roll mill, a sand mill or an attritor. Of these, a sand mill is preferred because homogeneous dispersing can be attained most effectively. After mixing the coloring agent and the vehicle, the mixture is dispersed in a vessel heated to a temperature higher by 10° to 20° C. than the melting point of the vehicle, under application of high shearing force. To this dispersion, a solvent is further added as a diluent, and the mixture is dispersed again at temperatures of 25° to 35° C. The resulting dispersion is cooled to room temperature, whereby a gelled thermofusible ink is prepared.

As the wax component for use in the upper image transfer portion 4, the vehicles employed for preparing the thermofusible ink for the lower image transfer portion 3 can be used.

As the resin for the resin network structure 6 in the lower image transfer portion 3, and for the porous resin structure 10 for the upper image transfer portion 4, resins having a glass transition temperature higher than the melting point of the thermofusible gelled ink can be used. Examples of such resins include vinyl chloride resin, vinyl chloride—vinyl acetate copolymer, polyester resin, epoxy resin, polycarbonate resin, phenolic resin, polyimide resin, cellulose resin, polyamide resin and acrylic resin.

In order to facilitate the formation of the resin network structure 6 and the porous resin structure 10, it is preferable to incorporate into the formulations of the lower image transfer portion 3 and the upper image transfer portion 4 a blowing agent which expands when the coated mixture for each of the image transfer portions 3 and 4 is dried with application of heat, so that the configuration or distribution of the resin network in the lower image transfer portion 3 becomes homogeneous, and a uniform fine porous resin structure is formed in the upper image transfer portion 4.

Preferable examples of such blowing agents are azo compounds such as azodicarbonic amide, azobisisobutyronitrile, azocyclohexyl nitrile, diazoaminobenzene and barium diazocarboxylate.

In order to control the expansion temperature and the expansion efficiency of such blowing agents, a blowing accelerating agent such as zinc oxide, varieties of stearates and palmitates, or a plasticizer such as dioctyl phthalate may be further added, if necessary.

The amount of such a blowing agent is not specifically limited. However, it is preferable that such a blowing agent be added in an amount of 5 to 30 wt. % to the entire amount of the solid components in the resin and the thermofusible gelled ink in the upper image transfer portion 3 and the upper image transfer portion 4 in view of the formation of the voids or pores in those image transfer portions, because the image transfer performance and the mechanical strength of the formed image transfer medium tend to depend upon the density of the voids or pores in those image transfer portions. In other words, there is a tendency that the more the voids or pores, the higher the image transfer performance, but the less the mechanical strength of the image transfer recording medium.

The resin network structure 6 and the fine porous resin structure 10 can also be formed not only by using the above-mentioned blowing agent, but by employing a method in combination therewith in which a mixture of the resin and the thermofusible gelled ink or a mixture of the resin and the wax component is dissolved in a mixed solvent of a solvent with a high volatility or with a low boiling point and a solvent with a low volatility or with a high boiling point, and drying each mixture.

As such low-boiling point solvents, those which are capable of dissolving the resin can be used, while as the high-boiling point solvents, it is not always necessary that the high-boiling point solvents be capable of dissolving the resin, but only requirement is that the resin be not eventually separated when dissolved in a mixed solvent of the low-boiling point solvent and the high-boiling point solvent. It is preferable that the mixing ratio of the high-boiling point solvent to the low-boiling point solvent be in the range of 5–30 wt. % to 95–70 wt. %, more preferably in the range of 10–20 wt. % to 90–80 wt. %.

Examples of such a high-boiling point solvent include aromatic solvents such as toluene and xylene, saturated hydrocarbon solvents such as n-octane, n-decane and n-undecane, with a boiling point of more than about 100° C., preferably in the range of about 110°–200° C. Examples of the low-boiling point solvent include solvents with a boiling point of about 100° C. or less, preferably in the range of about 50°–90° C., such as acetone, methyl ethyl ketone, and tetrahydrofuran.

The thickness of the lower image transfer portion is preferably in the range of 3 to 15 μm, although it can be determined depending upon how many times the recording medium is to be used for image printing. As to the upper image transfer portion 3, the thinner, the better for image transfer, but it is preferable that the thickness be in the range of 1 to 5 μm.

Figure 2:
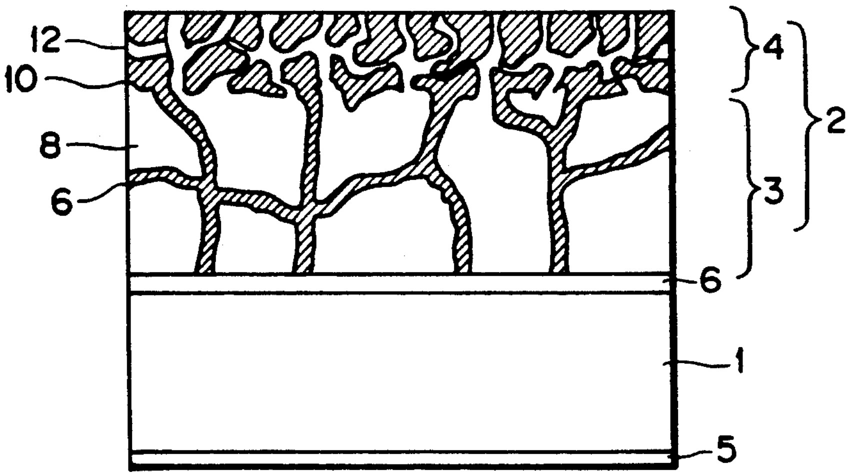
FIG. 2 is a schematic partial cross-sectional view of another thermal image transfer recording medium according to the present invention.

In the present invention, as shown in FIG. 2, an adhesive layer 6 may also be interposed between the support 1 and the ink layer 2, if necessary. By the adhesive layer 6, the ink layer 2 can be firmly fixed on the support 1.

Examples of the materials for the adhesive layer 6 include ethylene—vinyl acetate copolymer, vinyl chloride—vinyl acetate copolymer, ethylene—acrylate copolymer, polyethylene, polyamide, polyester, petroleum resin and nylon. These materials can be used alone or in combination.

The thickness of the adhesive layer is preferably in the range of 0.2 to 2.0 μm from the view points of the adhesiveness of the adhesive layer 6 and the thermal sensitivity of the formed thermal image transfer recording medium.

Other features of this invention will become apparent in the course of the following description of exemplary embodiments, which are given for illustration of the invention and are not intended to be limiting thereof.

EXAMPLE 1

Preparation of Support

One surface of a polyethylene terephthalate film having a thickness of 4.5 μm was coated with a silicone resin, whereby a support provided with a heat-resistant protective layer was prepared.

Preparation of Lower Image Transfer Layer

A mixture of the following components was dispersed in a mixed solvent of toluene and methyl ethyl ketone to obtain a dispersion:

| | Parts by Weight |
|---|---|
| Carbon black | 15 |
| Candelilla wax | 80 |
| Oxidized polyethylene wax | 25 |
| Vinyl chloride - vinyl acetate copolymer | 20 |
| Azobisisobutyronitrile | 20 |

The thus obtained dispersion was coated on the above prepared support on the opposite side to the heat-resistant protective layer, and dried, whereby a lower image transfer layer with a thickness of 10 μm was formed.

Preparation of Upper Image Transfer Layer

A mixture of the following components was dispersed in a mixed solvent of toluene and methyl ethyl ketone to obtain a dispersion:

| | Parts by Weight |
|---|---|
| Candelilla wax | 35 |
| Oxidized polyethylene | 20 |
| Vinyl chloride - vinyl acetate copolymer | 40 |
| Azobisisobutyronitrile | 5 |

The thus obtained dispersion was coated on the above prepared lower image transfer layer, and dried, whereby an upper image transfer layer with a thickness of 5 μm was formed, which serves as an ink transfer-controlling layer, whereby thermal image transfer recording medium No. 1 according to the present invention was prepared.

EXAMPLE 2

A mixture of 60 parts by weight of a monoglyceride of lanolin fatty acid and 25 parts by weight of oxidized polyethyelene wax was prepared.

The procedure for Example 1 was repeated except that the formulation of the upper image transfer layer employed in Example 1 was replaced by the following formulation, whereby thermal image transfer recording medium No. 2 according to the present invention was prepared.

| | Parts by Weight |
|---|---|
| Candelilla wax | 35 |
| Oxidized polyethylene | 20 |
| Vinyl chloride - vinyl acetate copolymer | 16 |
| Mixture of the monoglyceride and oxidized polyethylene wax | 24 |
| Azobisisobutyronitrile | 5 |

COMPARATIVE EXAMPLE 1

A mixture of the following components was dispersed in a mixed solvent of toluene and methyl ethyl ketone to obtain a dispersion for forming an thermofusible ink layer:

| | Parts by Weight |
|---|---|
| Carbon black | 15 |
| Candelilla wax | 60 |
| Oxidized polyethylene wax | 25 |
| Vinyl chloride - vinyl acetate copolymer | 100 |

The thus obtained dispersion was coated on the same support as prepared in Example 1 and dried, whereby comparative thermal image transfer recording medium No. 1 with a single thermofusible ink layer with a thickness of 15 μm was prepared.

EXAMPLE 3

Preparation of Thermofusible Gelled Ink

The following components were placed in a sand mill vessel and dispersed at 110° C. to prepare an uniform ink.

| | Parts by Weight |
|---|---|
| Carbon black | 15 |
| Candelilla wax | 60 |
| Oxidized polyethylene wax | 23 |
| Terpene resin (dispersing agent) | 2 |

After decreasing the temperature of the thus obtained ink to 65° C., 10 parts by weight of benzol black, which is an oil-soluble dye with a low melting point, and 675 parts by weight of a mixed solvent of methyl ethyl ketone and toluene (2:1 by weight) were added to the ink. The mixture was dispersed once again at 32° C., and cooled to room temperature, whereby a thermofusible gelled ink was prepared.

Preparation of Lower Image Transfer Layer

The following components were dispersed to obtain a dispersion:

| | Parts by Weight |
|---|---|
| Thermofusible gelled ink (prepared above) | 10 |
| 20% solution of vinyl chloride - vinyl acetate copolymer dissolved | 3 |

-continued

| | Parts by Weight |
|---|---|
| in a mixed solvent of methyl ethyl ketone and toluene (2:1 by weight) | |
| Azobisisobutyronitrile | 20 |

The thus obtained dispersion was coated on one side of a 4.5 μm thick polyethylene terephthalate (PET) film which was subjected to heat resistance imparting treatment, and dried at 75° C., whereby a lower image transfer layer with a thickness of 8 μm was formed.

Preparation of Upper Image Transfer Layer

A thermofusible gelled wax composition was prepared by mixing the following components in the same manner as in the procedure for preparing the thermofusible gelled ink in Example 3 except that the coloring components were removed therefrom:

| | Parts by Weight |
|---|---|
| Candelilla wax | 60 |
| Oxidized polyethylene wax | 23 |
| Terpene resin (dispersing agent) | 2 |

10 parts by weight of the above thermofusible gelled wax composition and 3 parts by weight of a 20% solution of vinyl chloride—vinyl acetate copolymer dissolved in a mixed solvent of methyl ethyl ketone and toluene (2:1 by weight) were mixed to prepare a dispersion.

The thus obtained dispersion was coated on the above prepared lower image transfer layer, and dried at 110° C., whereby an upper image transfer layer with a thickness of 2 μm was formed, whereby thermal image transfer recording medium No. 3 according to the present invention was prepared.

EXAMPLE 4

A support provided with a heat-resistant protective layer was prepared in the same manner as in Example 1.

A lower image transfer layer was formed on the support in the same manner as in Example 3 except that the vinyl chloride—vinyl acetate copolymer used as the resin component of the lower image transfer layer in Example 3 was replaced by a nitrocellulose having a molecular weight of 100,000.

On the surface of the above prepared lower image transfer layer, an upper image transfer layer was formed in the same manner as in Example 1, whereby thermal image transfer recording medium No. 4 according to the present invention was prepared.

EXAMPLE 5

A support provided with a heat-resistant protective layer was prepared in the same manner as in Example 1.

A lower image transfer layer was formed on the support in the same manner as in Example 3 except that the vinyl chloride—vinyl acetate copolymer used as the resin component of the lower image transfer layer in Example 3 was replaced by a nitrocellulose having a molecular weight of 100,000.

On the surface of the above prepared lower image transfer layer an upper image transfer layer was formed in the same manner as in Example 1 except that the vinyl chloride—vinyl acetate copolymer used as the resin component of the upper layer portion in Example 1 was replaced by cellulose açetate butylate, whereby thermal image transfer recording medium No. 5 according to the present invention was prepared.

EXAMPLE 6

Preparation of Support

One surface of a polyester film having a thickness of 4.5 μm was coated with a silicone resin, whereby a support provided with a heat-resistant protective layer was prepared.

Preparation of Lower Image Transfer Layer

A mixture of the following components was dispersed in a mixed solvent of toluene and methyl ethyl ketone (1:1 by weight) to obtain a dispersion:

| | Parts by Weight |
|---|---|
| Carbon black | 15 |
| Monoglyceride of behenic acid | 30 |
| Candelilla wax | 40 |
| Polyethylene oxide wax | 15 |
| Vinyl chloride - vinyl acetate copolymer | 20 |

The thus obtained dispersion was coated on the above prepared support on the opposite side to the heat-resistant protective layer, and dried, whereby a lower image transfer layer with a thickness of 10 μm was formed.

Preparation of Upper Image Transfer Layer

A mixture of the following components was dispersed in a mixed solvent of toluene and methyl ethyl ketone (1:1 by weight) to obtain a dispersion:

| | Parts by Weight |
|---|---|
| Monoglyceride of behenic acid | 30 |
| Candelilla wax | 40 |
| Polyethylene oxide wax | 15 |
| Vinyl chloride - vinyl acetate copolymer | 17 |

The thus obtained dispersion was coated on the above prepared lower image transfer layer, and dried, whereby an upper image transfer layer with a thickness of 5 μm was formed, whereby thermal image transfer recording medium No. 6 according to the present invention was prepared.

Each of the above prepared thermal image transfer recording media Nos. 1 to 6 according to the present invention and comparative thermal image transfer recording medium No. 1 was incorporated in a line thermal printer, and images were transferred four times to an image receiving sheet from the same portion of the recording medium under the following conditions:

| | |
|---|---|
| Thermal head: | Thin-film head type |
| Platen pressure: | 230 gf/cm |
| Peeling angle against image receiving sheet: | 45° |
| Energy applied from thermal head: | 22 $mJ/mm^2$ |
| Printing speed: | 2 inch/sec |
| Image receiving sheet: | high quality paper having a Bekk's smoothness of 320 sec. |

The density of the images obtained by each time of 1st, 2nd, 3rd and 4th printings was measured by a McBeth desitometer RD-914. The results are shown in the table below.

TABLE

| Recording Medium | Density of Images | | | |
|---|---|---|---|---|
| | 1st | 2nd | 3rd | 4th |
| No. 1 | 1.21 | 1.30 | 1.25 | 1.22 |
| No. 2 | 1.25 | 1.34 | 1.28 | 1.23 |
| No. 3 | 1.34 | 1.38 | 1.31 | 1.19 |
| No. 4 | 1.23 | 1.23 | 1.21 | 1.14 |
| No. 5 | 1.16 | 1.17 | 1.14 | 1.05 |
| No. 6 | 1.48 | 1.45 | 1.39 | 1.26 |
| Comp. No. 1 | 1.45 | 1.26 | 1.02 | 0.88 |

The date shown in the above table clearly demonstrate that the thermal image transfer recording media according to the present invention can yield images without causing a substantial decrease in the image density even when the recording media are used repeatedly.

What is claimed is:

1. A thermal image transfer recording medium comprising a support and an ink layer formed thereon which comprises (i) a lower thermal image transfer portion located in the vicinity of the support, comprising a three-dimensional network structure of a resin with a voidage A and a thermofusible ink which is held within said network structure, and (ii) an upper thermal image transfer portion located on top of said lower thermal image transfer portion, comprising a fine porous structure of a resin with a voidage B which is smaller than the voidage A of the network structure, and a thermofusible wax component which is held within said porous structure, and said network structure being at least partially connected to both said porous structure and said support.

2. The thermal image transfer recording medium as claimed in claim 1, wherein each of said lower thermal image transfer portion and said upper thermal image transfer portion is in the form of a layer.

3. The thermal image transfer recording medium as claimed in claim 1, further comprising a heat-resistant protective layer on said support on the opposite side to said ink layer.

4. The thermal image transfer recording medium as claimed in claim 1, further comprising an adhesive layer which is interposed between said support and said ink layer.

5. The thermal image transfer recording medium as claimed in claim 1, wherein said resin for said three-dimensional network structure in said lower image transfer portion and said resin for said fine porous structure in said upper porous portion are compatible with each other.

6. The thermal image transfer recording medium as claimed in claim 1, wherein said support comprises a heat resistant material.

7. The thermal image transfer recording medium as claimed in claim 1, wherein said thermofusible ink is a thermofusible gelled ink.

8. The thermal image transfer recording medium as claimed in claim 1, wherein said thermofusible ink comprises a coloring agent and a vehicle.

9. The thermal image transfer recording medium as claimed in claim 5, wherein said resin for said three-dimensional network structure in said lower image transfer portion is selected from the group consisting of vinyl chloride resin, vinyl chloride—vinyl acetate copolymer, polyester resin, epoxy resin, polycarbonate resin, phenolic resin, polyimide resin, cellulose resin, polyamide resin and acrylic resin.

10. The thermal image transfer recording medium as claimed in claim 5, wherein said resin for said fine porous structure in said upper image transfer layer portion is selected from the group consisting of vinyl chloride resin, vinyl chloride—vinyl acetate copolymer, polyester resin, epoxy resin, polycarbonate resin, phenolic resin, polyimide resin, cellulose resin, polyamide resin and acrylic resin.

11. The thermal image transfer recording medium as claimed in claim 8, wherein said coloring agent is selected from the group consisting of carbon black, phthalocyanine pigments, direct dyes, acidic dyes, basic dyes, dispersible dyes and oil-soluble dyes.

12. The thermal image transfer recording medium as claimed in claim 8, wherein said vehicle is selected from the group consisting of beeswax, carnauba wax, whale wax, Japan wax, candelilla wax, rice bran wax, montan wax, paraffin wax, microcrystalline wax, oxidized wax, ozocerite, ceresine wax, ester wax, margaric acid, lauric acid, myristic acid, palmitic acid, stearic acid, fromic acid, behenic acid, stearyl alcohol, behenyl alcohol, glyceride, sorbitan fatty acid ester, stearic amide and oleic amide.

13. The thermal image transfer recording medium as claimed in claim 1, wherein said thermofusible wax component in said upper thermal image transfer portion is selected from the group consisting of beeswax, carnauba wax, whale wax, Japan wax, candelilla wax, rice bran wax, montan wax, paraffin wax, microcrystalline wax, oxidized wax, ozocerite, ceresine wax, ester wax, margaric acid, lauric acid, myristic acid, palmitic acid, stearic acid, fromic acid, behenic acid, stearyl alcohol, behenyl alcohol, glyceride, sorbitan fatty acid ester, stearic amide and oleic amide.

14. The thermal image transfer recording medium as claimed in claim 1, wherein said lower image transfer portion has a thickness of 3 to 15 μm.

15. The thermal image transfer recording medium as claimed in claim 1, wherein said upper image transfer portion has a thickness of 1 to 5 μm.

16. The thermal image transfer recording medium as claimed in claim 6, wherein said heat resistant material for said support is selected from the group consisting of polyester, polycarbonate, triacetyl cellulose, nylon, polyimide, cellophane, parchment paper and condenser paper.

17. The thermal image transfer recording medium as claimed in claim 1, wherein said support has a thickness of 2 to 15 μm.

18. The thermal image transfer recording medium as claimed in claim 3, wherein said heat-resistant protective layer comprises a material selected from the group consisting of silicone resin, fluorine-contained resin, a polyimide resin, epoxy resin, phenolic resin, melamine resin and nitrocellulose.

19. The thermal image transfer recording medium as claimed in claim 4, wherein said adhesive layer comprises a material selected from the group consisting of ethylene—vinyl acetate copolymer, vinyl chloride—vinyl acetate copolymer, ethylene—acrylate copolymer, polyethylene, polyamide, polyester, petroleum resin and nylon.

20. The thermal image transfer recording medium as claimed in claim 4, wherein said adhesive layer has a thickness of 0.2 to 2.0 μm.

* * * * *

UNITED STATES PATENT AND TRADEMARK OFFICE

CERTIFICATE OF CORRECTION

PATENT NO. : 5,183,697

DATED : February 2, 1993

INVENTOR(S) : Ide, et al

It is certified that error appears in the above-indentified patent and that said Letters Patent is hereby corrected as shown below:

Column 8, line 22, replace "an" with --a--.

Column 11, line 14, replace "date" with --data--.

Signed and Sealed this

Twenty-ninth Day of March, 1994

Attest:

BRUCE LEHMAN

Attesting Officer

Commissioner of Patents and Trademarks